(12) United States Patent
Malvasi et al.

(10) Patent No.: US 11,081,949 B2
(45) Date of Patent: Aug. 3, 2021

(54) ELECTRICAL DEVICE

(71) Applicant: PIERBURG PUMP TECHNOLOGY GMBH, Neuss (DE)

(72) Inventors: Alessandro Malvasi, Leghorn (IT); Martin Helmis, Neuss (DE)

(73) Assignee: PIERBURG PUMP TECHNOLOGY GMBH, Neuss (DE)

(*) Notice: Subject to any disclaimer, the term of this patent is extended or adjusted under 35 U.S.C. 154(b) by 313 days.

(21) Appl. No.: 16/320,483

(22) PCT Filed: Jul. 28, 2016

(86) PCT No.: PCT/EP2016/068054
§ 371 (c)(1),
(2) Date: Jan. 25, 2019

(87) PCT Pub. No.: WO2018/019378
PCT Pub. Date: Feb. 1, 2018

(65) Prior Publication Data
US 2019/0252961 A1  Aug. 15, 2019

(51) Int. Cl.
*H02P 25/08* (2016.01)
*H02K 29/08* (2006.01)
(Continued)

(52) U.S. Cl.
CPC .............. *H02K 29/08* (2013.01); *H02K 1/14* (2013.01); *H02K 1/223* (2013.01); *H02K 11/33* (2016.01); *H02P 1/465* (2013.01); *H02P 6/22* (2013.01)

(58) Field of Classification Search
CPC ........ H02K 29/08; H02K 1/223; H02K 11/33; H02K 1/14; H02K 1/465; H02P 6/22; H02P 1/465
See application file for complete search history.

(56) References Cited

U.S. PATENT DOCUMENTS 5,675,226 A    10/1997 Riola
2003/0098660 A1  5/2003 Erdman et al.
(Continued)

FOREIGN PATENT DOCUMENTS

CA    2015605 A1   11/1990
CN    2148435 Y    12/1993
(Continued)

*Primary Examiner* — Karen Masih
(74) *Attorney, Agent, or Firm* — Norman B. Thot

(57) ABSTRACT

An electrical device includes a brushless one-phase driving motor which drives a mechanical unit. The brushless one-phase driving motor includes a motor rotor which is radially permanently magnetized and which rotates around a rotational rotor axis, a non-symmetric stator back-iron structure which includes a rotor opening for the motor rotor and a lateral bridge portion which magnetically connect two stator poles, a single stator coil which surrounds the lateral bridge portion, a pole separation gap arranged radially opposite to the lateral bridge portion, the pole separation gap magnetically separating the two stator poles, an electronic control device which drives the single stator coil, and a single hall sensor which is electrically connected to the electronic control device. The single hall sensor is arranged approximately radially opposite to the single stator coil with respect to the rotational rotor axis.

7 Claims, 2 Drawing Sheets

(51) Int. Cl.
*H02K 11/33* (2016.01)
*H02K 1/14* (2006.01)
*H02K 1/22* (2006.01)
*H02P 1/46* (2006.01)
*H02P 6/22* (2006.01)

(56) References Cited

U.S. PATENT DOCUMENTS

| | | |
|---|---|---|
| 2004/0145336 A1 | 7/2004 | Marioni |
| 2006/0145638 A1 * | 7/2006 | Gerfast .................. H02P 6/182 |
| | | 318/400.29 |
| 2007/0273323 A1 | 11/2007 | Acquaviva et al. |
| 2010/0225207 A1 | 9/2010 | Chen et al. |
| 2015/0092522 A1 | 4/2015 | Saito et al. |
| 2017/0033637 A1 | 2/2017 | Matsuoka |

FOREIGN PATENT DOCUMENTS

| | | |
|---|---|---|
| CN | 1575537 A | 2/2005 |
| CN | 104518636 A | 4/2015 |
| EP | 0 565 312 A2 | 10/1993 |
| JP | S6237046 A | 2/1987 |
| JP | H09-294389 A | 11/1997 |
| JP | 2000-102283 A | 4/2000 |
| JP | 2000-354390 A | 12/2000 |
| JP | 2015-142497 A | 8/2015 |
| WO | WO 01/45235 A1 | 6/2001 |

\* cited by examiner

ELECTRICAL DEVICE

CROSS REFERENCE TO PRIOR APPLICATIONS

This application is a U.S. National Phase application under 35 U.S.C. § 371 of International Application No. PCT/EP2016/068054, filed on Jul. 28, 2016. The International Application was published in English on Feb. 1, 2018 as WO 2018/019378 A1 under PCT Article 21(2).

FIELD

The present invention relates to an electrical device with a brushless one-phase driving motor and with a mechanical unit which is driven by the driving motor. The present invention in particular relates to an electrical auxiliary device in an automotive application, for example, an electrical fluid pump, and in particular to an electrical gas pump. The present invention in particular relates to relatively small devices with a relatively small driving motor.

BACKGROUND

A one-phase driving motor is generally a compact and simple construction and therefore relatively inexpensive compared to a multiple-phase driving motor. Since the motor is brushless, an electronic control device is provided for driving the stator coils and for providing the electromagnetic commutation.

JP 2000-102283 A describes a typical one-phase driving motor with a non-symmetric stator back-iron structure and with a single stator coil arranged in a satellite position. The motor is not provided with any hall sensor so that the sensing of the correct commutation moment is difficult.

One-phase driving motors with a non-symmetric stator back-iron structure could be provided with a hall sensor for detecting the commutation moment. Since a hall sensor detects any magnetic field, the best hall sensor signal quality is achieved if the electromagnetic stator coil is switched off for a particular period for exactly sensing the change of the rotating magnetic field generated by the rotating motor rotor. This has the disadvantage that the electrical performance of the driving motor is significantly reduced if the electromagnetic stator coil must be switched off twice during every complete rotor rotation.

SUMMARY

An aspect of the present invention is to provide an electrical device with the high electrical performance of the brushless one-phase driving motor.

In an embodiment, the present invention provides an electrical device comprising a brushless one-phase driving motor which is configured to drive a mechanical unit. The brushless one-phase driving motor includes a motor rotor which is radially permanently magnetized and which is configured to rotate around a rotational rotor axis, a non-symmetric stator back-iron structure comprising a rotor opening for the motor rotor and a lateral bridge portion which is configured to magnetically connect two stator poles, a single stator coil which is configured to surround the lateral bridge portion, a pole separation gap arranged radially opposite to the lateral bridge portion, the pole separation gap being configured to magnetically separate the two stator poles, an electronic control device configured to drive the single stator coil, and a single hall sensor which is electrically connected to the electronic control device. The single hall sensor is arranged approximately radially opposite to the single stator coil with respect to the rotational rotor axis.

BRIEF DESCRIPTION OF THE DRAWINGS

The present invention is described in greater detail below on the basis of embodiments and of the drawings in which.

DETAILED DESCRIPTION

Figure 1:
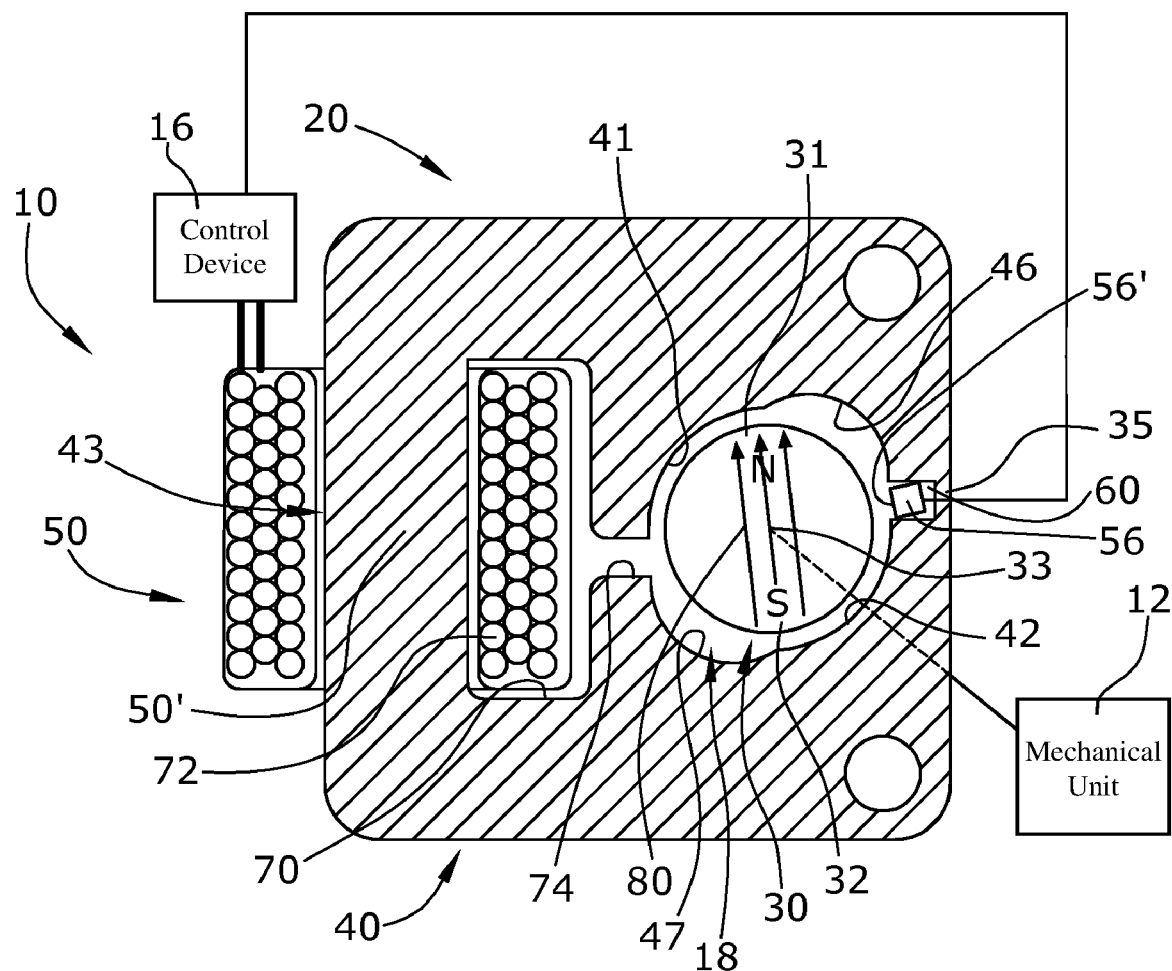
FIG. 1 shows an embodiment of the electrical device with a hall sensor arranged in the separation gap.

The electric device according to the present invention is provided with a brushless one-phase driving motor and with a mechanical unit which is driven by the driving motor. The mechanical unit can, for example, be a pumping unit for pumping a fluid.

The driving motor is provided with a motor rotor which is permanently radially magnetized and which rotates around a rotor axis. The motor rotor can be realized as a rotor body with separate permanent magnets, but can alternatively be provided, for example, as one single ferromagnetic rotor body.

The driving motor is provided with a non-symmetric stator back-iron structure which defines an axial rotor opening which defines two stator poles. The stator back-iron structure is also provided with a lateral bridge portion which magnetically connects the two stator poles. The stator back-iron structure is typically defined by numerous stator sheets. The bridge-portion is surrounded by a single stator coil.

A pole separation gap is provided approximately radially opposite of the bridge portion and the stator coil with respect to the rotor axis. The pole separation gap magnetically separates the two arms of the back-iron structure defining the two stator poles. The separation gap can be designed to completely separate the two stator pole arms of the back-iron structure from each other so that only an air gap is present between the two arms of the back-iron structure. The separation gap can alternatively be provided as a partial gap so that a relatively small mechanic connective portion of the back-iron structure mechanically connects the respective end portions and poles of the back iron body.

The driving motor is provided with an electronic control device for electrically driving the stator coil. The electronic control device comprises several power semiconductors for commutating the electric energy driving the stator coil.

One single hall sensor is provided which is electrically connected to the control device to thereby signalize the moment of commutation to the control device. The hall sensor is arranged approximately radially opposite to the stator coil with respect to the rotor axis. The hall sensor can, for example, be provided radially outwardly of the motor rotor so that the hall sensor basically sees the radial magnetic field of the motor rotor. The hall sensor is positioned as far as possible from the stator coil so that the aerial magnetic field generated by the stator coil is relatively weak at the position of the hall sensor. The magnetic field generated by the stator coils is consequently relatively weak at the hall sensor position in relation to the magnetic field generated by the motor rotor. There is therefore no longer the need to switch off the stator coil to provide a sufficient electromagnetic situation to sense the motor rotors magnetic field at the hall sensor position.

Since the stator coils can remain electromagnetically active during almost the complete 360° rotation, the available performance of the driving motor is significantly improved. Notwithstanding the fact that the stator coils can almost always be active, the sensed magnetic field generated by the motor rotor at the hall sensor position is so much higher that a sufficient commutation reliability can be realized and a relatively precise commutation moment is signalized by the hall sensor to the control device.

The commutation signal generated by the hall sensor is consequently precise enough to, for example, directly trigger the commutation at the control device. The control device is therefore, for example, only provided with analog hardware of which the commutation means is directly triggered by the commutation signal generated by the hall sensor. The control device is not provided with a complex microprocessor or even with any kind of digital microprocessor. The control device is therefore simple, reliable and can be provided at low-cost.

In an embodiment of the present invention, the hall sensor can, for example, be arranged within an angle of 160° to 200° as seen from the middle of the stator coil and with reference to the rotational rotor axis. The middle of the stator coils is in particular the geometric and electromagnetic center of the stator coil. The hall sensor does not need to be exactly diametrically opposite, namely, in an angle of exactly 180°, with respect to the coil middle, but within a range of +/−20° around 180° so that the interference of the electromagnetic field generated by the stator coil with the magnetic field of the rotating motor rotor at the sensor position is relatively low. The hall sensor can, for example, be positioned in a rotational position which exactly corresponds with the commutation moment.

In an embodiment of the present invention, the hall sensor can, for example, at least in part overlap with the separation gap. The axial electromagnetic field at the separation gap is relatively low so that the hall sensor only reads a relatively weak interference signal caused by the electromagnetic field coming from the back-iron structure in this area. The hall sensor can, however, be positioned outside of the cross plane defined by the motor rotor but, for example, with a minimum axial displacement with respect to the motor rotor.

The hall sensor can, for example, be positioned at least in part in the separation gap. This means that the hall sensor can be positioned within the cross plane of the motor rotor so that a relatively precise detection of the magnetic pole transition caused by the rotating rotor can be realized.

The active plane of the hall sensor can, for example, be orientated to the rotational axis. More precisely, the normal of the hall sensor's active plane is directed to and crosses the rotor axis. The hall sensor is therefore in an optimal spacial position to precisely detect the magnetic pole transition of the two magnetic rotor poles passing by.

In an embodiment of the present invention, the back iron structure can, for example, be provided with a non-cylindrical rotor opening and can, for example, be provided with two axial recesses which are geometrically opposed to each other with respect to the rotor axis. The two recesses provide, as seen in the circumferential direction, a non-symmetric electromagnetic structure which defines one single rotational direction when the driving motor is started. This structure allows the driving of a mechanical unit which is realized as a pump and allows the use of only one single hall sensor because the rotational direction does not need to be detected. This concept of the electrical device therefore allows a low-cost electrical pump to be provided.

The motor rotor can, for example, be diametrically magnetized. A diametric magnetizing of the motor rotor provides a quasi-sinusoidal magnetic field generated by the rotating motor rotor at the hall sensor position. The detection of the rotors magnetic pole transition by the hall sensor is therefore precise and reliable.

Two embodiments of the present invention are described below with reference to the drawings.

Both figures show an electrical device 10 comprising a brushless one-phase driving motor 20 which directly drives a mechanical unit 12. The mechanical unit 12 is an unidirectional pumping unit, for example, a gas pump used as a so-called purge pump for pumping fuel vapor.

The driving motor 20 comprises a motor rotor 30 defined by a single motor rotor body of a permanently magnetized ferromagnetic material. The motor rotor 30 is diametrically magnetized and defines a diametric magnetization 80 and thereby defines two magnetic poles 31, 32.

The driving motor 20 also comprises a non-symmetric stator back-iron structure 40 with an axial rotor opening 18 and which defines two diametrically opposed back-iron stator poles 41, 42. The axial rotor opening 18 is, as seen in cross section, not cylindrical, but is provided with two axial recesses 46, 47 to reliably define a single rotational starting direction of the motor rotor 30. The stator poles 41, 42 are separated by two pole separation gaps 74, 60 which are arranged exactly diametrically to each other with respect to the rotational rotor axis 33. The pole separation gap 74 next to the stator coils 50 is a total gap so that no mechanical or electromagnetic connection between the stator poles 41, 42 exist. The other pole separation gap 60 is remote from the stator coil 50 in an angle of about 170° with respect to a cross plane of the stator coil 50 or with respect to the geometric middle 50' of the stator coil 50.

The back-iron structure 40 is defined by ferromagnetic metal sheets lying in a cross plane with respect to the rotational rotor axis 33. The back-iron structure 40 is provided with a lateral bridge portion 43 mechanically and magnetically connecting the two stator poles 41, 42. The back-iron structure 40 also is provided with an axial coil opening 70 defined by the lateral bridge portion 43 and by parts of the back-iron structure 40 defining the stator poles 41, 42.

The driving motor 20 comprises the stator coil 50 which consists of a single coil wire 72 and which completely surrounds the lateral bridge portion 43 of the back-iron structure 40. The middle 50' of the stator coil 50 is defined and located in the axial and radial center of the stator coil 50, and also defines the mechanical balance point of the stator coil 50. The stator coil 50 is provided and located as a satellite with respect to the rotational rotor axis 33.

The stator coil 50 is electrically driven by a motor control device 16 which comprises only analog hardware but does not comprise any digital microprocessor so that the motor control device 16 is simple, reliable and cost-effective.

The driving motor 20 is also provided with a single hall sensor 56, 52 for detecting the magnetic field generated by the motor rotor 30. The hall sensor 52, 56 is electrically connected to the motor control device 16 for sending a commutation signal to the motor control device 16.

The hall sensor 56 of the first embodiment of FIG. 1 is located and arranged in the pole separation gap 60 and in the plane of the motor rotor 30.

Figure 2:
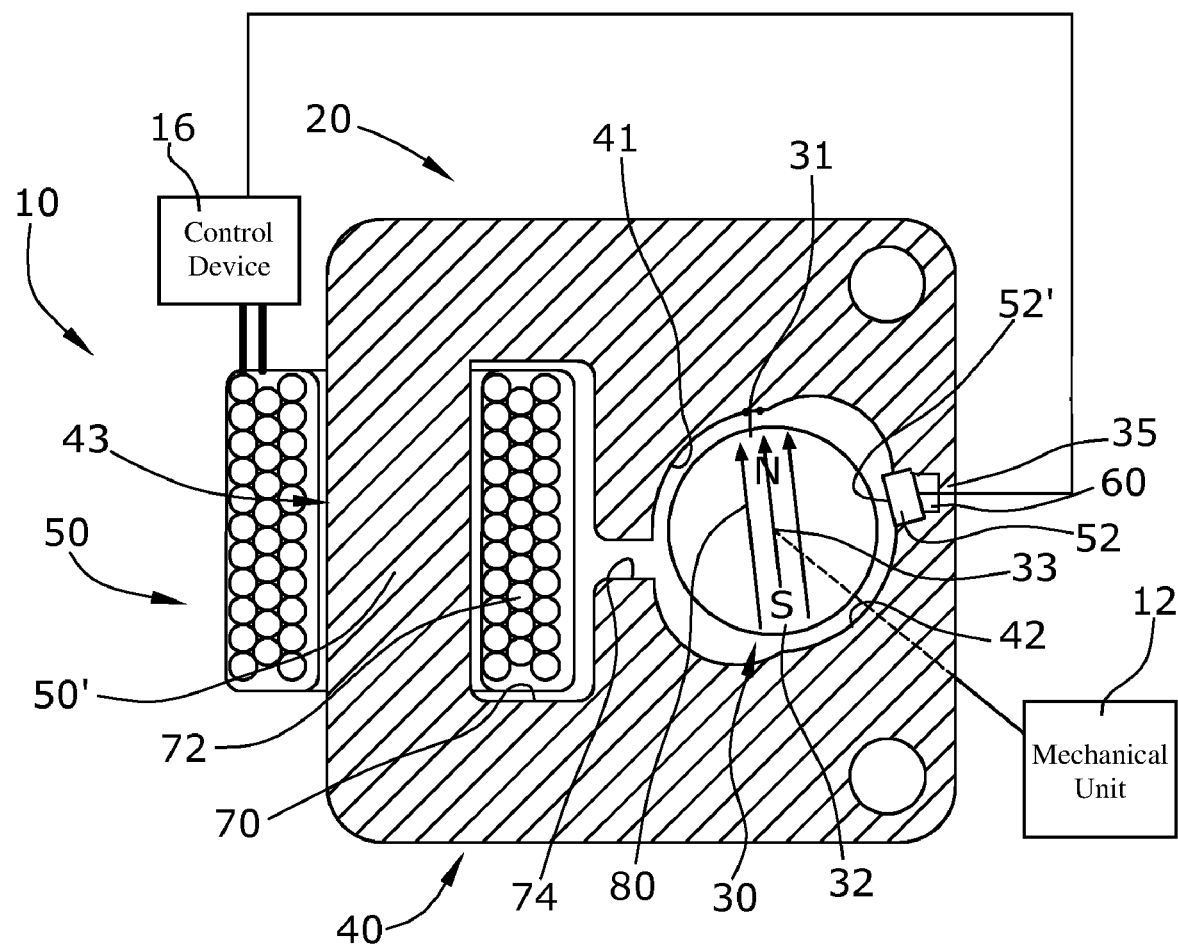
FIG. 2 shows an embodiment of the electrical device with a hall sensor arranged with an axial offset with respect to the cross plane defined by the motor rotor.

The hall sensor 52 of the second embodiment shown in FIG. 2 is positioned with an axial overlap with the pole separation gap 60, whereas the hall sensor 56 of the first embodiment shown in FIG. 1 is positioned and arranged completely in the pole separation gap 60. The active plane 52', 56' of the respective hall sensor 52, 56 is exactly orientated to the rotational rotor axis 33.

The present invention is not limited to embodiments described herein; reference should be had to the appended claims.

What is claimed is:

1. An electrical device comprising a brushless one-phase driving motor which is configured to drive a mechanical unit, the brushless one-phase driving motor comprising:
    a motor rotor which is radially permanently magnetized and which is configured to rotate around a rotational rotor axis;
    a non-symmetric stator back-iron structure comprising a rotor opening for the motor rotor and a lateral bridge portion which is configured to magnetically connect two stator poles;
    a single stator coil which is configured to surround the lateral bridge portion;
    a pole separation gap arranged radially opposite to the lateral bridge portion, the pole separation gap being configured to magnetically separate the two stator poles;
    an electronic control device configured to drive the single stator coil; and
    a single hall sensor which is electrically connected to the electronic control device, the single hall sensor being arranged approximately radially opposite to the single stator coil with respect to the rotational rotor axis, wherein,
    the single hall sensor is arranged outside of a cross plane which is defined by the motor rotor, and
    the single hall sensor is arranged within an angle of 160° to 200°, as seen from a middle of the single stator coil and with reference to the rotational rotor axis, but is not arranged in an angle of 180° as seen from the middle of the single stator coil and with reference to the rotational rotor axis.

2. The electrical device as recited in claim 1, wherein the single hall sensor is arranged to at least in part overlap with the pole separation gap.

3. The electrical device as recited in claim 1, wherein the single hall sensor comprises an active plane which is orientated to the rotational rotor axis.

4. The electrical device as recited in claim 1, wherein the single hall sensor is arranged in the pole separation gap.

5. The electrical device as recited in claim 1, wherein,
    the electronic control device comprises commutating hardware, and
    the single hall sensor is configured to generate a commutating signal which directly drives the commutating hardware of the control device.

6. The electrical device as recited in claim 1, wherein the rotor opening of the non-symmetric stator back iron structure is a non-cylindrical rotor opening which comprises two axial recesses which are arranged to be geometrically opposed with respect to the rotational rotor axis.

7. The electrical device as recited in claim 1, wherein the motor rotor is diametrically magnetized.

* * * * *